United States Patent [19]
Luginsland

[11] Patent Number: 6,070,838
[45] Date of Patent: Jun. 6, 2000

[54] ERGONOMIC MOUSE PAD

[76] Inventor: James F Luginsland, 49 Westwood Ave., Deer Park, N.Y. 11729

[21] Appl. No.: 09/326,317

[22] Filed: Jun. 7, 1999

[51] Int. Cl.[7] .............................. B43L 15/00; A47B 91/00
[52] U.S. Cl. .................................. 248/118.5; 248/346.01; 248/918
[58] Field of Search ............................. 248/346.01, 346, 248/118, 118.3, 118.5, 918

[56] References Cited

U.S. PATENT DOCUMENTS

| | | | |
|---|---|---|---|
| 5,058,840 | 10/1991 | Moss | 248/118.5 |
| 5,265,835 | 11/1993 | Nash | 248/118.5 |
| 5,370,346 | 12/1994 | Long | 248/118.5 |
| 5,743,499 | 4/1998 | Wang | 248/118 |
| 5,927,663 | 7/1999 | Tseng | 248/118.5 |
| 5,975,469 | 11/1999 | Chen | 248/118.1 |

Primary Examiner—Anita M. King
Assistant Examiner—Michael Nornberg
Attorney, Agent, or Firm—Michael I. Kroll

[57] ABSTRACT

The present invention 10 discloses an apparatus for improving the operation of a mouse computer input device 31. Disclosed is a padded, contoured, 360 degree movable member 18 for receiving the forearm 16 of the user 12 which member 18 operates on a first platform 20. A second platform 24 is provided upon which the mouse 31 operates on a mouse pad 32. The first platform 20 has connecting means being a tongue-like plate 22 with the second platform, with the tongue 22 having slots 26 in its edge for receiving a locking member 44 positioned on the edge of the second platform 24 whereby the distance between the tow platforms 20,24 can be adjusted. The height of the second platform 24 is also adjustable using members 30 which use peg-like members 68 positioned on its corners for height adjustment and attaching means.

10 Claims, 14 Drawing Sheets

ERGONOMIC MOUSE PAD

BACKGROUND OF THE INVENTION

1. Field of the Invention

The present invention relates generally to mouse pads and, more specifically, to a device having means for continuously supporting the arm of the pointing device user while the pointing device is being used on a planar surface. The device comprises a padded forearm platform which engages a mouse pad platform. The padded forearm platform has a padded forearm member having a contoured upper surface for resting a part of the forearm thereon and a bottom surface having a number of roller balls encased therein providing means for moving the padded forearm member in any direction upon the planar surface of the padded forearm platform which has a raised border for containing the padded forearm member thereon. Further said padded forearm platform has a tongue member which is inserted into the aperture of the mouse pad platform. The padded forearm platform tongue member has a number of slots located on one edge for selectively inserting an engaging member therein.

The mouse pad platform is comprised of a number of releasably engageable planar members comprising a base member having a non skid bottom surface having a cavity for receiving the padded forearm tongue member and a dovetail groove having a slidable locking member for selectively engaging the slots of the padded forearm tongue member thereby providing means for adjusting the distance between the padded forearm platform and the mouse pad platform. Further said mouse pad base member has a number of apertures for receiving the peg members of the height adjustment planar members which provides means for raising the mouse pad to an ergonomic level.

2. Description of the Prior Art

There are other mouse pad device designed for providing an ergonomic work surface. Typical of these is U.S. Pat. No. 5,355,811 issued to Brewer on Oct. 18, 1994.

Another patent was issued to Smith et al. on May 13, 1997 as U.S. Pat. No. 5,628,483. Yet another U.S. Pat. No. 5,713,544 was issued to Wolf et al. on Feb. 3, 1989 and still yet another was issued on Oct. 20, 1998 to Nettekoven as U.S. Pat. No. 5,823,488.

Another patent was issued to Baranowski on Nov. 10, 1998 as U.S. Pat. No. 5,833,180.

U.S. Pat. No. 5,355,811

Inventor: Brian H. Brewer

Issued: Oct. 18, 1994

The adjustable leg supported mouse pad designed to enable a user to use a mouse input device directly over his or her upper leg or thigh while sitting. The leg supported mouse pad includes a saddle structure capable of engaging the user's thigh and horizontally aligning a planar mouse pad attached thereto over the user's thigh. The saddle structure includes a rectangular shaped flexible panel with two five-sided support members attached to the top surface thereon on opposite sides of the flexible panel's transverse axis. When the flexible panel is disposed transversely over the user's upper leg while sitting, the support members are repositioned so that their medial planar surfaces are oriented in a substantially horizontal position. The support members are spaces apart on the flexible panel so that a mouse pad maybe supported on two support member's medial planar surfaces. In one embodiment, at least one of the support members is adjustably attached to the flexible panel which enables the device to be adjusted for use on different leg sizes. Also, the mouse pad may have an optional, raised edge designed to prevent a mouse placed thereon from sliding off.

U.S. Pat. No. 5.628,483

Inventor: Mark R. Smith et al.

Issued: May 13, 1997

A wrist rest (1) of specially designed height and other characteristics is provided for reducing strain on the wrists and hands of a keyboard operator or a similar user of computer accessories. The rest (1) is made to be placed in front of the keyboard or accessory being used, and may be designed to have a particular firmness for comfort In some embodiments the rest has two foam rubber layers (20,30) about ¾ inch thick total; the bottom surface has no skin, to prevent the rest from slipping, while the upper surface has a smooth covering (10) so hands may slide around easily and comfortably. In order to allow rests designed for a normal keyboard to be adapted for use with an especially long keyboard, or with an accessory like a mouse pad (4), one embodiment (3) of the invention has contours (101) which can interlock with similar contours (100) on an extension pad (2); these contours are also designed to be easily and inexpensively manufactured.

U.S. Pat. No. 5.713,544

Inventor: Robert J. Wolf

Issued: 5,713,544

A wrist assembly for use along the front edge of a device to be operated by a person's hands or fingers, such as in front of a computer keyboard, including an elongated base on which is supported an elongated pad comprising a layer of gel with the covering. The pad has sufficient thickness between its top and bottom surfaces and width between its edges to afford supporting a users wrists on the top surface with a portion of the layer of gel beneath and conforming to the supported wrists and to afford significant motion of the top surface of the pad with the supported wrists relative to the bottom surface in a plane generally parallel to the upper surface of the base. The base has a top portion supporting the pad, a bottom portion adapted to be supported on a horizontal surface; and structure that allows the top portion to be supported on a bottom portion with the top surface of the pad at a predetermined one of several different distances above the horizontal surface.

U.S. Pat. No. 5.823,488

Inventor: Bernard E. Nettekoven

Issued: Oct. 20, 1998

An apparatus which reduces arm, wrist and shoulder stress and pain while using a computer mouse device. This apparatus includes an adjustable work surface which is capable of aligning the angle inclination as well as the angle of rotation of a mouse device user's hand, wrist and forearm with respect to the stationary working surface of the structure on which the apparatus is resting while operating the mouse device. The apparatus is adaptable to fit any adult size and is capable of use with either the left or right hand.

U.S. Pat. No. 5.833,180

Inventor: James P. Baranowski

Issued: Nov. 10, 1998

A computer mouse operation pad and forearm support assembly for providing forearm and wrist support to a user operating a computer mouse on a computer mouse operation pad from a sitting position, the assembly comprising (I) an integrated unit formed by joining a computer mouse operation pad to a forearm support in such a manner that a front region is defined by the computer mouse operation pad, a back region is defined by the forearm support, and a middle region is defined by the natural repose of the wrist of the user when the forearm of the user is resting upon the forearm support while the user is operating the computer mouse on the computer mouse operation pad, and (ii) a clamp for attaching the assembly to a worksurface having top, front and bottom surfaces, the integrated unit attached rotatively the clamp.

While these mouse pad devices may be suitable for the purposes for which they were designed, they would not be as suitable for the purposes of the present invention, as hereinafter described.

SUMMARY OF THE PRESENT INVENTION

The present invention discloses an apparatus for improving the operation of a mouse computer input device. Disclosed is a padded, contoured, 360 degree movable member for receiving the forearm of the user which member operates on a first platform. A second platform is provided upon which the mouse operates on a mouse pad The first platform has connecting means being a tongue-like plate with the second platform, with the tongue having slots in its edge for receiving a locking member positioned on the edge of the second platform whereby the distance between the two platforms can be adjusted. The height of the second platform is also adjustable using members which use peg-like members positioned on its corners for height adjustment and attaching means.

A primary object of the present invention is to provide a device for supporting the forearm of a computer workstation user while operating a mouse pointing device.

Another object of the present invention is to provide a device having two platforms whereby one platform supports the forearm of the user while the other provides a planar surface for the use of the mouse pointing device.

Yet another object of the present invention is to assist in the fluidity and control of the operator's hand/wrist motions to ease and lessen discomfort and assist in support of mouse operator's wrist area.

Still yet another object of the present invention is to provide a padded forearm platform having a padded forearm member having a cradle for supporting a portion of a users forearm thereon and said padded forearm member having a plurality of roller ball members embedded within the bottom surface providing means for effortlessly moving the padded forearm member in all direction.

Another object of the present invention is to provide a padded forearm platform having a horizontal planar surface having a raised border for operating and containing the padded forearm member thereon.

Yet another object of the present invention is to provide a padded forearm platform having a tongue member providing engagement means for the cavity of the mouse pad platform and distance adjustments means between the two platforms and said tongue member having a plurality of slots in one edge providing receptacle means for the mouse pad platform engaging locking member.

Still yet another object of the present invention is to provide a device having a mouse pad having a planar platform providing means for operating a pointing device thereon.

Another object of the present invention is to provide a device having a mouse pad platform having a bottom planar member having a non-skid bottom surface and a planar cavity for engaging the padded forearm tongue member. Further said bottom member has a dovetail groove on the padded forearm tongue member engaging edge and a top surfaces having a number of aperture for receiving the pegs of the height adjustment planar members.

Yet another object of the present invention is to provide a number of planar members having peg-like extensions on the bottom surface and a number of mating apertures on the top surfaces for receiving the peg-like extension members from other planar height adjustment members.

Still yet another object of the present invention is to provide a horizontal planar surfaces for placing a mouse pad thereon whereupon a mouse pointing device can be manipulated thereon.

Another object of the present invention is to provide a device whereupon a mouse pointing device can be used on a height adjustable platform and an engaging forearm support rest will alleviate most of the known shortcomings of the prior art which can cause long lasting health problems such as carpal tunnel syndrome.

Additional objects of the present invention will appear as the description proceeds The present invention overcomes the shortcomings of the prior art by providing a device having means for continuously supporting the arm of the pointing device user while the pointing device is being used in a planar surface. The device comprises a padded forearm platform which engages a mouse pad platform. The padded forearm platform has a padded forearm member having a contoured upper surface for resting a part of the forearm thereon and a bottom surface having a number of roller balls encased therein providing means for moving the padded forearm member in any direction upon the planar surface of the padded forearm platform which has a raised border for containing the padded forearm member thereon. Further said padded forearm platform has a tongue member which is inserted into the aperture of the mouse pad platform. The padded forearm platform tongue member has a number of slots located on one edge for selectively inserting an engaging member therein.

The mouse pad platform is comprised of a number of releasably engageable planar members comprising a base member having a non skid bottom surface having a cavity for receiving the padded forearm tongue member and a dovetail groove having a slidable locking member for selectively engaging the slots of the padded forearm tongue member thereby providing means for adjusting the distance between the padded forearm platform and the mouse pad platform. Further said mouse pad base member has a number of aperture for receiving the peg members of the height adjustment planar members which provides means for raising the mouse pad to an ergonomic level.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

REFERENCE NUMERALS

With regard to the reference numerals used, the following numbering is used throughout the various drawing figures.

10 present invention
12 user
14 work station
15 working surface
16 forearm
17 padding material
18 forearm support
19 forearm cradle
20 forearm platform
22 tongue member
24 mouse pad platform
26 slots
27 edge of tongue
30 horizontal member
31 mouse
32 mouse pad 33 direction arrow
34 base
36 planar surface
38 border
40 planar surface
42 cavity for tongue
44 locking means
46 groove
48 pin member
50 pin attachment means
54 bottom of forearm support member
56 roller balls
57 roller balls retaining means
58 roller balls sleeve
60 roller balls socket
62 female threaded means
64 aperture
65 non-skid bottom surface
66 aperture
68 height adjustment member
70 peg

DESCRIPTION OF THE PREFERRED EMBODIMENT(S)

Turning now descriptively to the drawings, in which similar reference characters denote similar elements throughout the several views, FIGS. 1 through 9 illustrate the present invention being a movable forearm support for use with a mouse computer input device.

Figure 1:
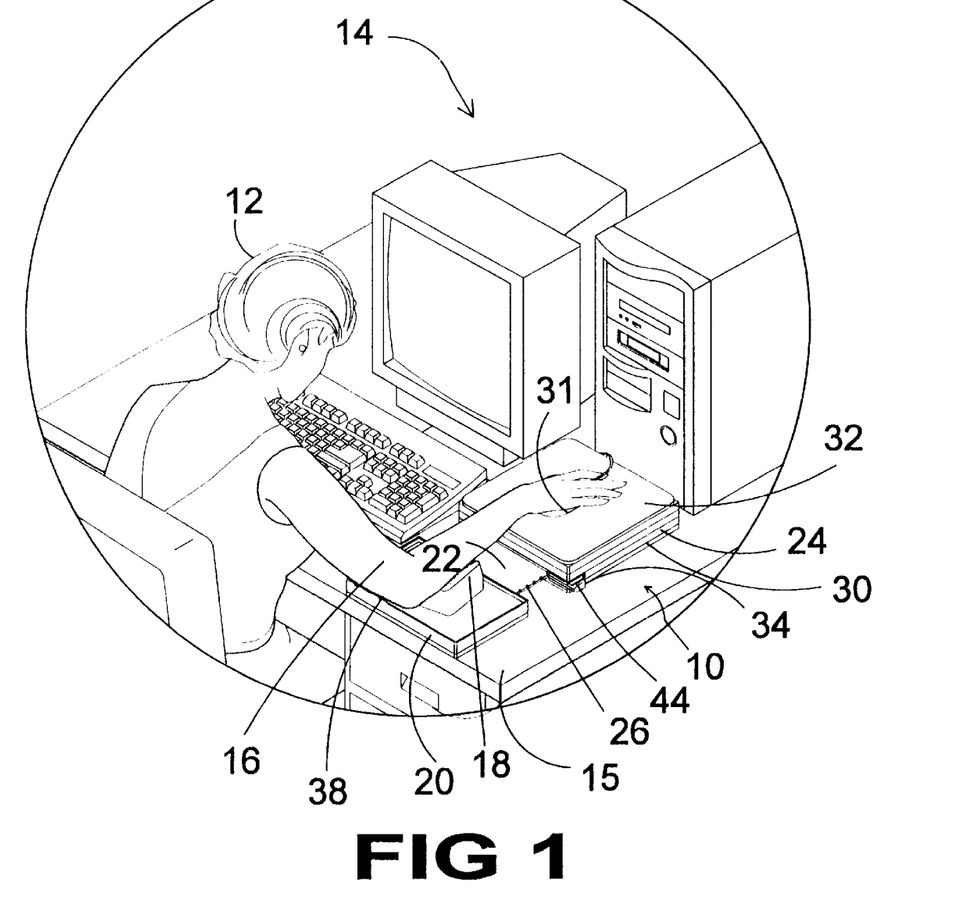
FIG. 1 is a perspective view of the present invention in use. Shown is a user at a computer workstation wherein the user has placed their forearm on the padded forearm support which permits movement in any direction within the confines of the padded forearm platform. The padded forearm support platform has a tongue member which provides adjustment of the distance between the padded forearm support platform and the mouse pad platform. The tongue also has a number of slots located on one side for receiving an engaging locking member located on the mouse pad platform. The mouse pad platform is comprised of a plurality of horizontally planar members used to adjust the height of the mouse pad. The height adjustment members are placed between the non-skid base and the mouse pad.

Turning to FIG. 1, therein is shown a perspective view of the present invention 10 in use. Shown therein is a user 12 operating a mouse 31 while sitting at a computer workstation 14 wherein the user 12 has placed their forearm 16 on the padded forearm support 18 being moveable in any direction within the confines of the raised border 38 of the forearm platform 20. The forearm support platform 20 has a tongue-like member or plate 22 which allows adjustment of the distance between the forearm support platform 20 and the mouse pad platform 24. The tongue 22 also has multiple slots 26 located on one side for receiving an engaging locking member 44 located on the mouse pad platform 24. The mouse pad platform 24 is comprised of a plurality of horizontally planar members 30 used to adjust the overall height of the mouse pad 32 above the working surface 15. The height adjustment members 30 are placed between the non-skid base 34 and the mouse pad 32 of the mouse pad platform 24.

Figure 2:
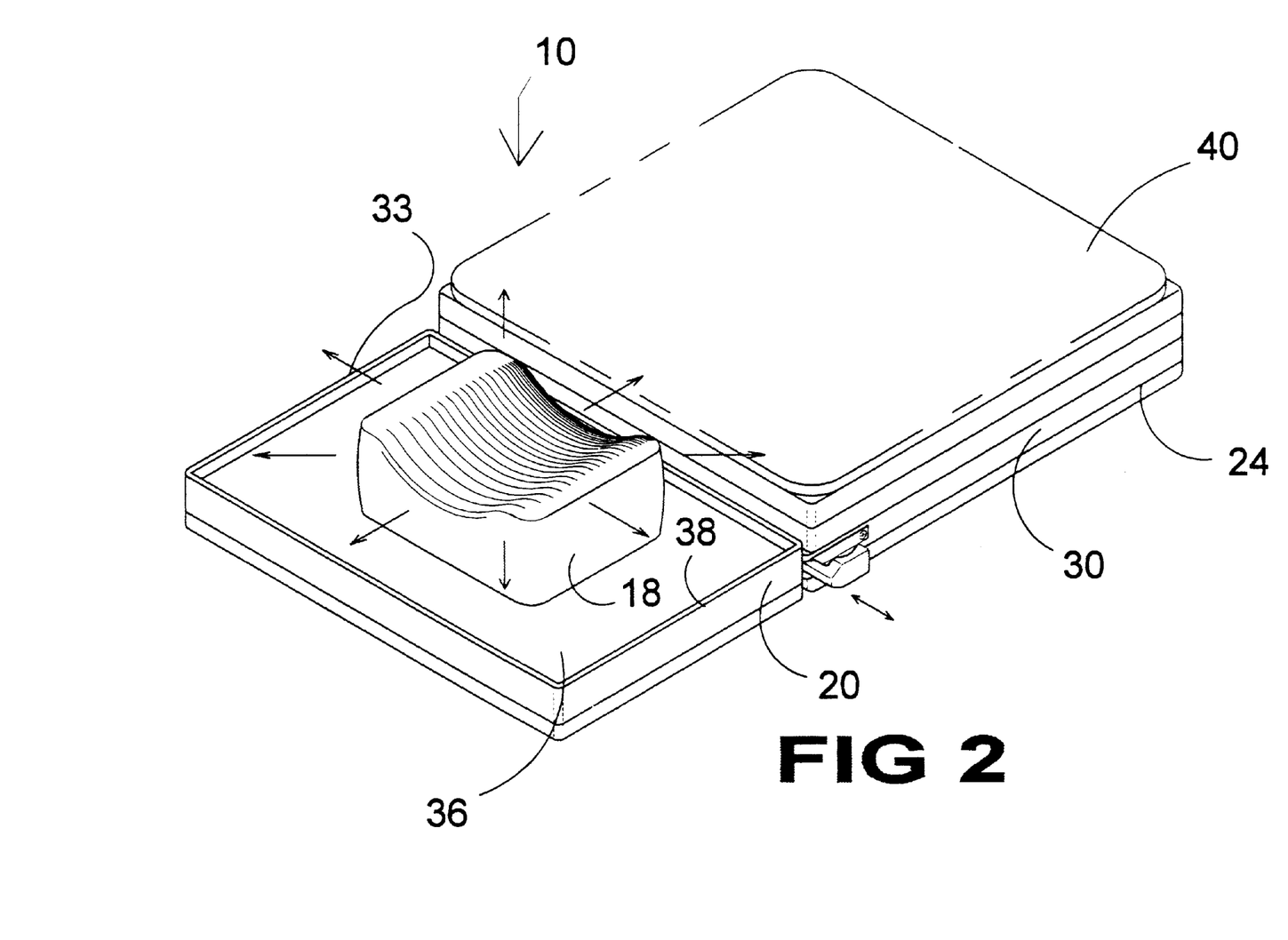
FIG. 2 is a perspective view of the present invention. Shown is the device having a forearm support which permits movement through 360 degrees over a planar surface having a raised border to contain the forearm support member and a mouse pad platform having a number of horizontal planar members providing means for adjusting the height of the planar surface whereupon a user will operate a mouse point device.

Turning to FIG. 2, therein is shown a perspective view of the present invention 10. Shown therein is the present invention having a forearm support 18 which permits movement through 360 degrees over a planar surface 36 having a raised border or lip 38 around its upper periphery to contain the forearm support member 18. Also shown is a mouse pad platform 24 having multiple horizontal planar plate-like members 30 providing means for adjusting the height of the planar surface 40 whereupon a user will operate a mouse device. Direction arrows 33 indicate that the support 18 is 360 degrees movable.

Figure 2A:
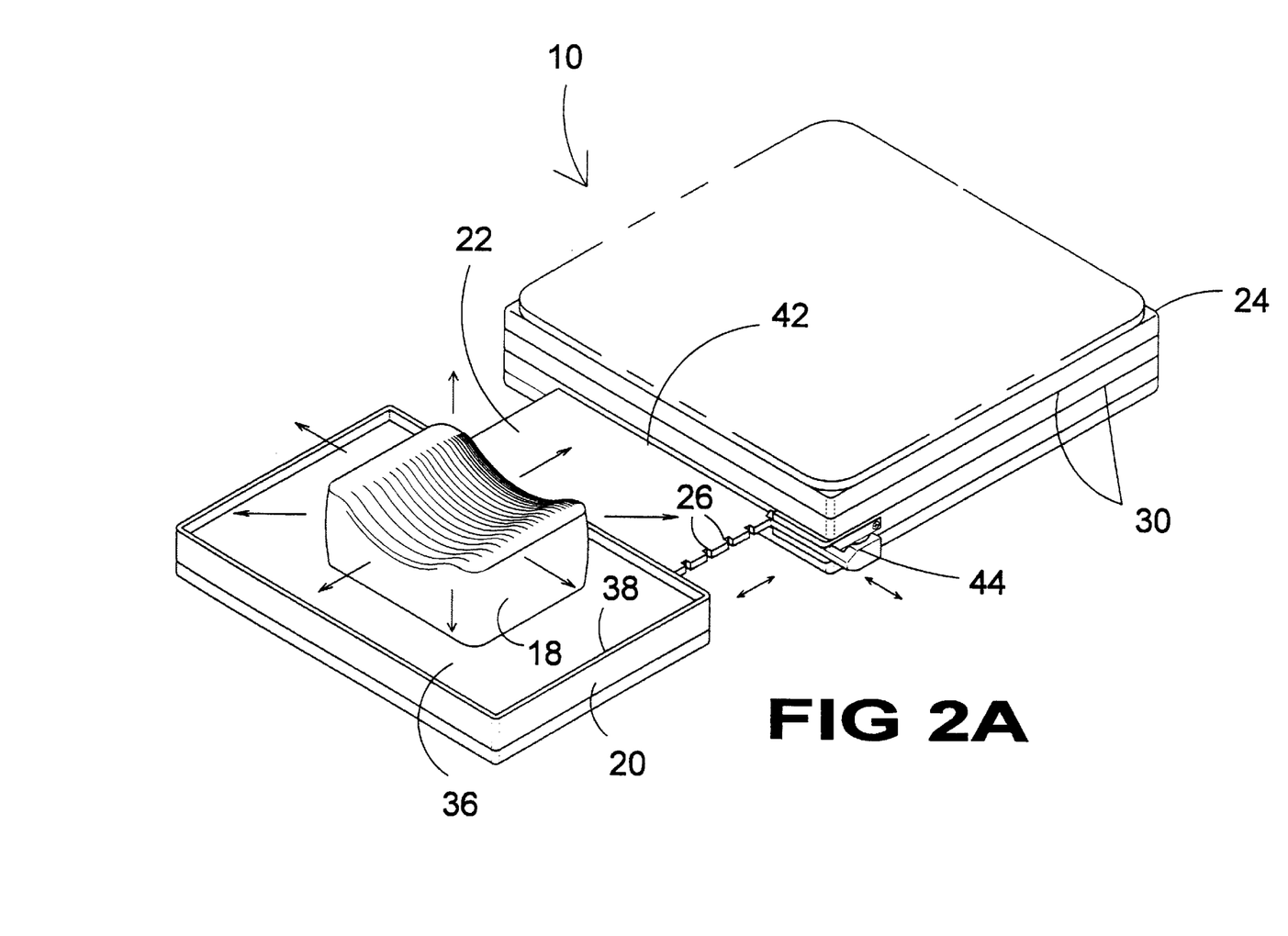
FIG. 2A is a perspective view of the present invention. Shown is the device having a forearm support member which permits movement through 360 degrees over a planar surface having a raised border to contain the forearm support member and having a tongue member having a number of slots located on one edge and a receiving cavity within the mouse pad platform and a slidably engaging member providing locking means for said selective positioning. Further the mouse pad platform has a number of horizontally planar members providing means for adjusting the height of the mouse pad.

Turning to FIG. 2A, therein is shown a perspective view of the present invention 10. Shown therein is the device having a forearm support member 18 which permits movement through 360 degrees over a planar surface 36 having a raised border 38 to contain the forearm support member 18. Also shown is a tongue member 22 having a plurality of slots 26 located on one edge and a receiving cavity 42 within the mouse pad platform 24 having a slidably engaging locking member 44 providing locking means for selectively positioning tongue 22. Further the mouse pad platform 24 has a number of horizontally planar members 30 providing means for adjusting the overall height of the mouse pad (not shown) above the working surface 15.

Figure 3:
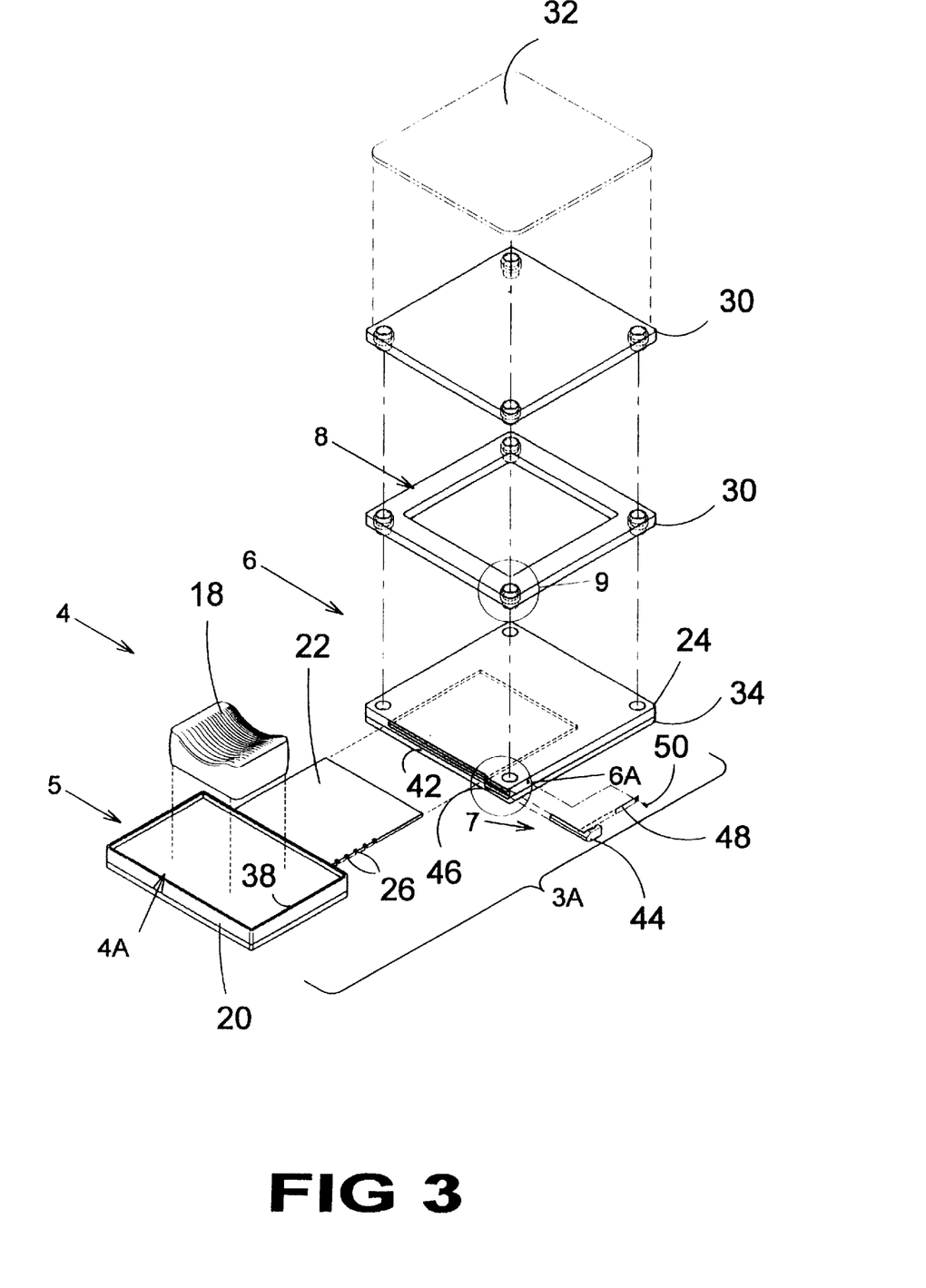
FIG. 3 is an exploded view of the present invention. Shown is a padded forearm support, which is movable over a padded forearm support platform having a raised border to contain the padded forearm support member thereon and having a tongue member which slides into a cavity located within the mouse pad platform. Further said padded forearm support tongue member has a plurality of slots located on one side for the purpose of inserting a slidably engaging member located in a dovetail groove on the mouse pad platform. The mouse pad platform has a bottom non-skid base member and a number of planar members which are mounted onto the base member and are used as height adjustment members having a mouse pad placed on the topmost member.

Turning to FIG. 3, therein is shown an exploded view of the present invention 10. Shown therein is a padded forearm support 18, which is movable over a padded forearm support platform 20 having a raised border 38 to contain the padded forearm support member 18 thereon and having a tongue member 22 which slides into a cavity 42 located within the mouse pad platform 24. Further said padded forearm support tongue member 22 has a plurality of slots 26 located on one side for the purpose of inserting a horizontally slidably engaging member 44 located in a dovetail groove 46 on the mouse pad platform 24. Also shown is a locking pin-like member 48 having attachment means 50 to mouse pad platform 24. The mouse pad platform 24 has a bottom non-skid base member 34 and a number of planar members 30 which are mounted on top of the base member 24 and are used as height adjustment members having a mouse pad 32 placed on the topmost member.

Figure 3A:
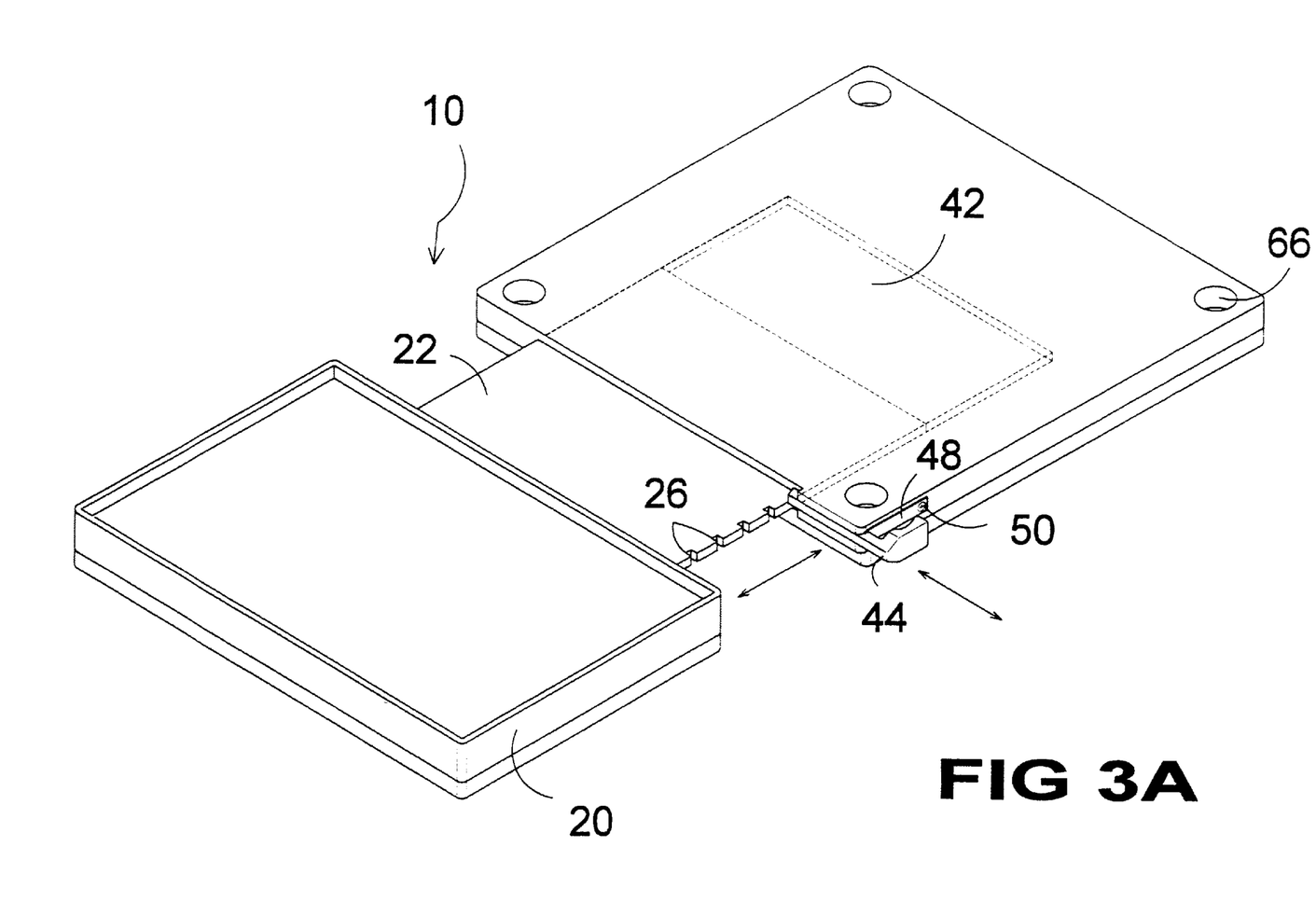
FIG. 3A is a perspective view of the padded forearm platform with the tongue member engaging the mouse platform cavity. Also shown is the mouse platform locking mechanism engaging one of a plurality of slots located on the edge of the padded forearm platform tongue.

Turning to FIG. 3A, therein is shown a perspective view of the present invention 10. Also shown is the padded forearm platform 20 with the tongue member 22 engaging the mouse platform cavity 42. Also shown is the mouse platform locking mechanism 44 perpendicular to and engaging one of a plurality of slots 26 located on the edge of the padded forearm platform tongue 22. Also shown is the pin 48 with attachment means 50, e.g., being a screw.

Figure 4:
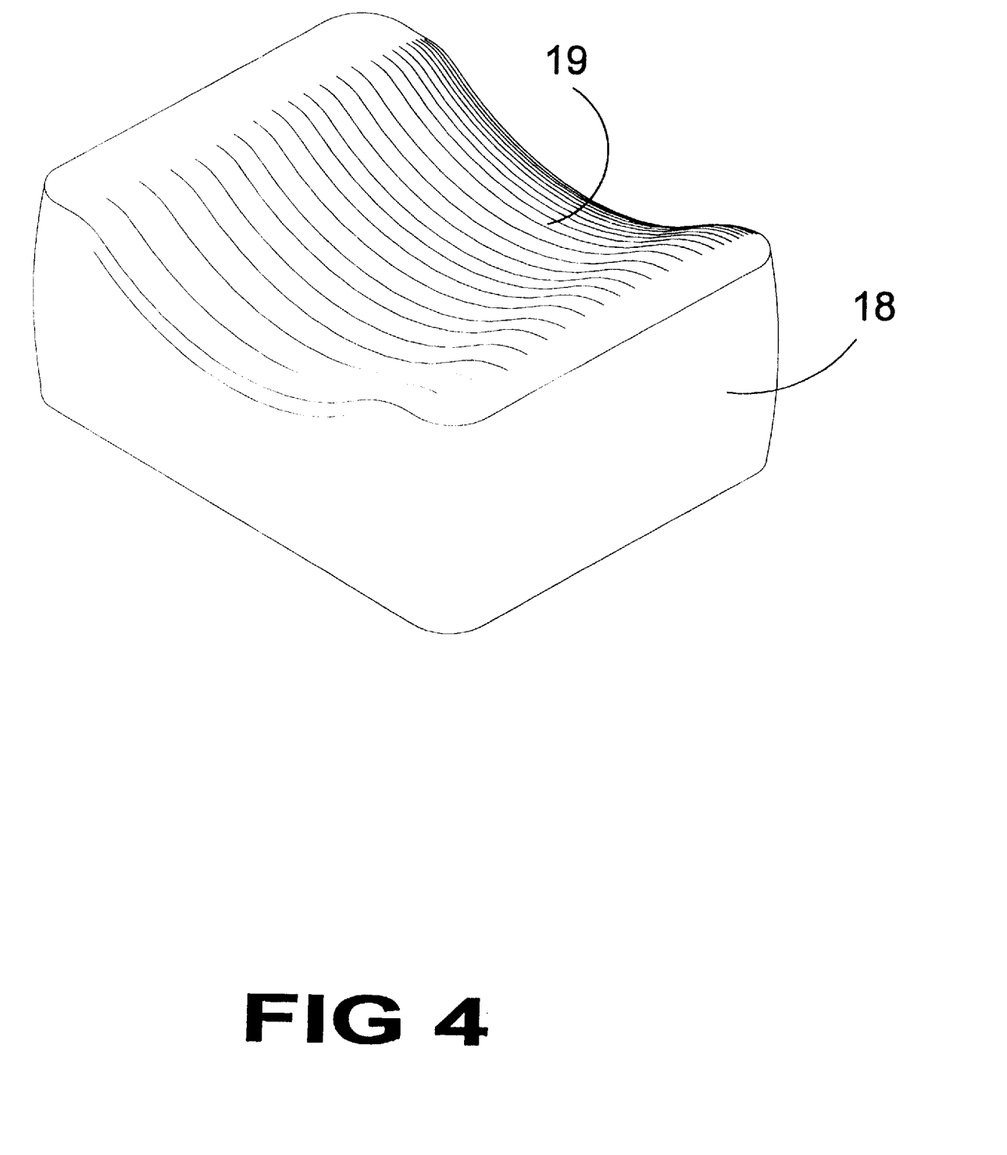
FIG. 4 is a perspective view of the padded forearm member of the present invention having a cradle for resting part of the forearm thereupon.

Turning to FIG. 4, therein is shown a perspective view of the padded forearm member 18 of the present invention having a padded cradle or contour 19 on its top surface for resting a part of the forearm of the user thereupon.

Figure 4A:
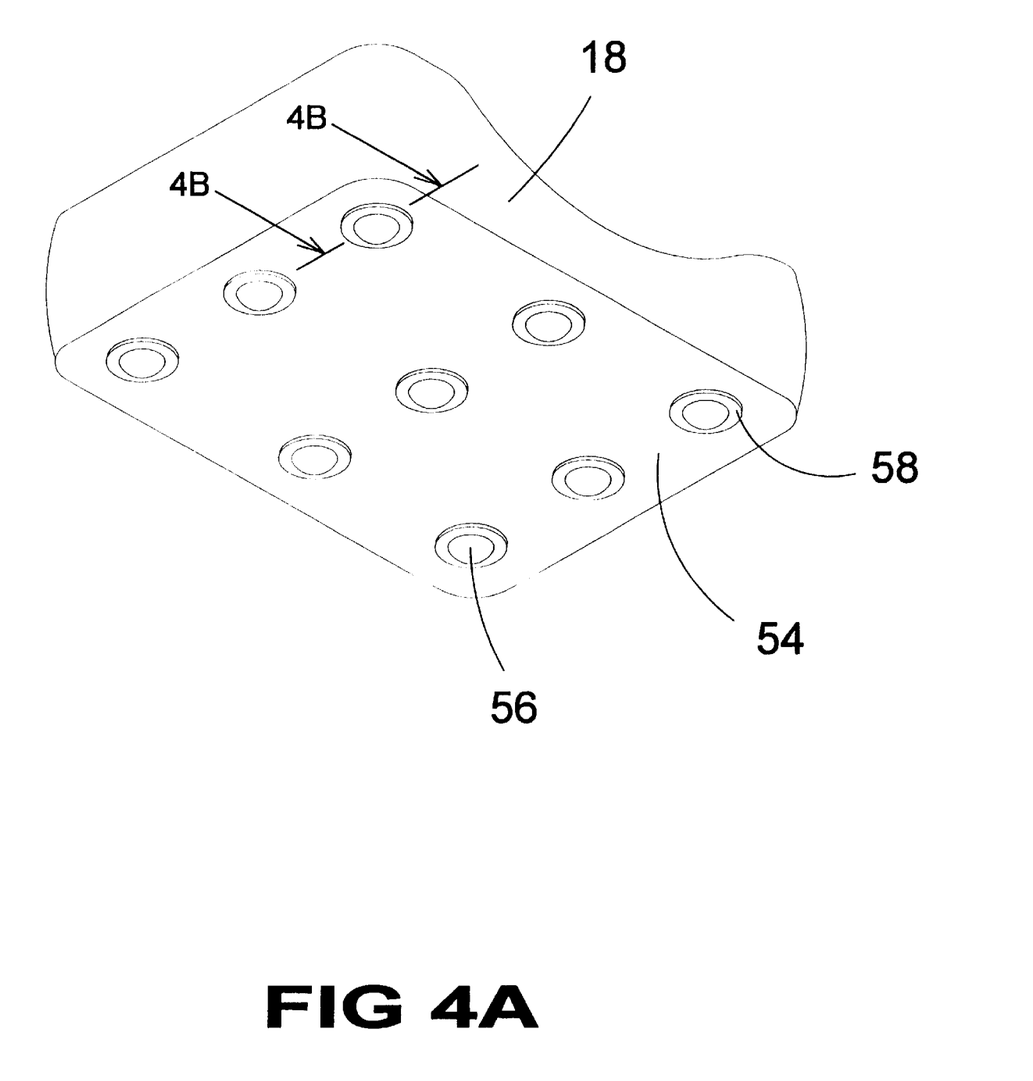
FIG. 4A is a perspective view of the bottom of the padded forearm member of the present invention. Shown is a plurality of roller balls imbedded within the surface providing means for moving said padded member in any direction with minimal effort.

Turning to FIG. 4A, therein is shown a perspective view of the bottom 54 of the padded forearm member 18 of the present invention. Shown therein are a plurality of roller balls 56 imbedded within the bottom surface providing means for moving the padded forearm member 18 in any direction with minimal effort. Multiple sleeves 58 to assist in mounting roller balls is also shown.

Figure 4B:
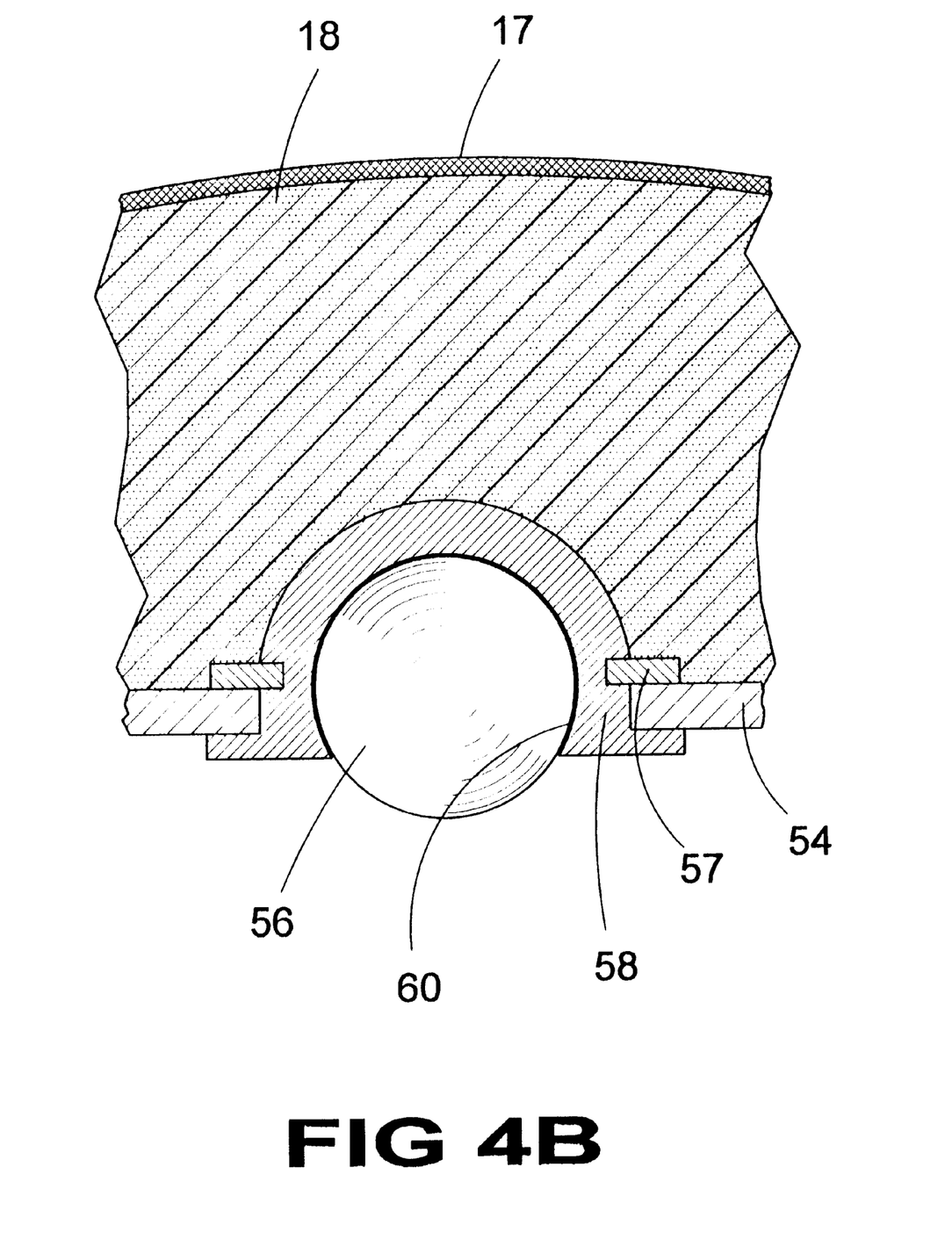
FIG. 4B is a cross sectional view taken from FIG. 4A as indicated showing one of the roller balls encased in a sleeve having retaining means preventing removal of said roller ball.

Turning to FIG. 4B, therein is shown a cross sectional view taken from FIG. 4A as indicated, showing one of the roller balls 56 encased in a sleeve 58 positioned in platform 18 which forms a socket 60 having retaining means 57 preventing removal of the roller ball 56 from the forearm support member 18 and its bottom 54. Padding material 17 is also shown.

Figure 5:
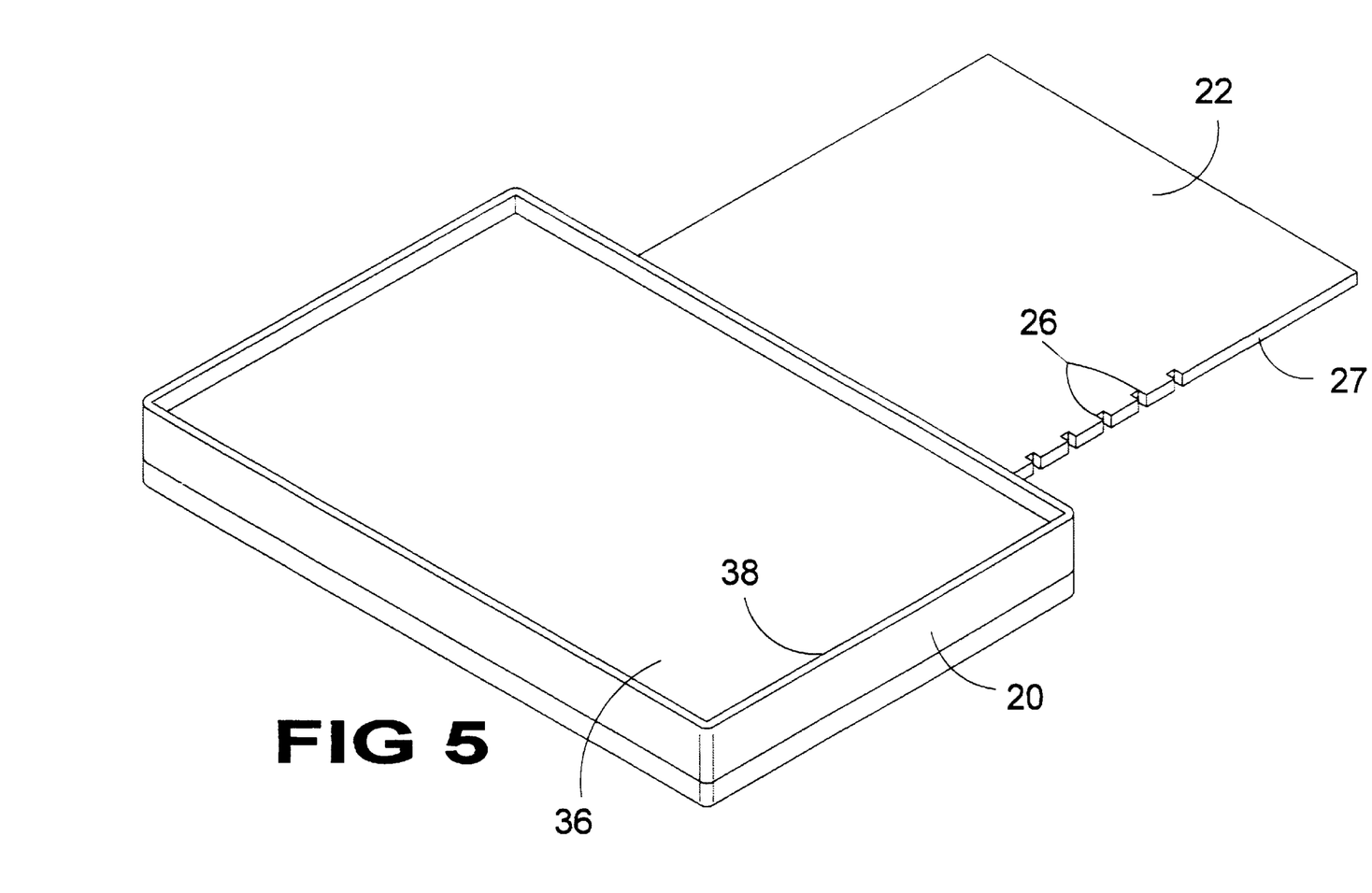
FIG. 5 is a perspective view of the padded forearm platform having a planar surface with a raised border for containing the padded forearm support within the planar platform and a tongue member having a plurality of slots located on one edge acting as receptacle slots for the locking mechanism of the mouse pad platform.

Turning to FIG. 5, therein is shown a perspective view of the padded forearm platform 20 having a planar surface 36 with a raised border 38 for containing the padded forearm support (not shown) within the planar platform border 38. Also shown is a tongue member 22 having a plurality of slots 26 located on one edge 27 acting as receptacle slots for receiving the locking mechanism (not shown) of the mouse pad platform (not shown).

Figure 6:
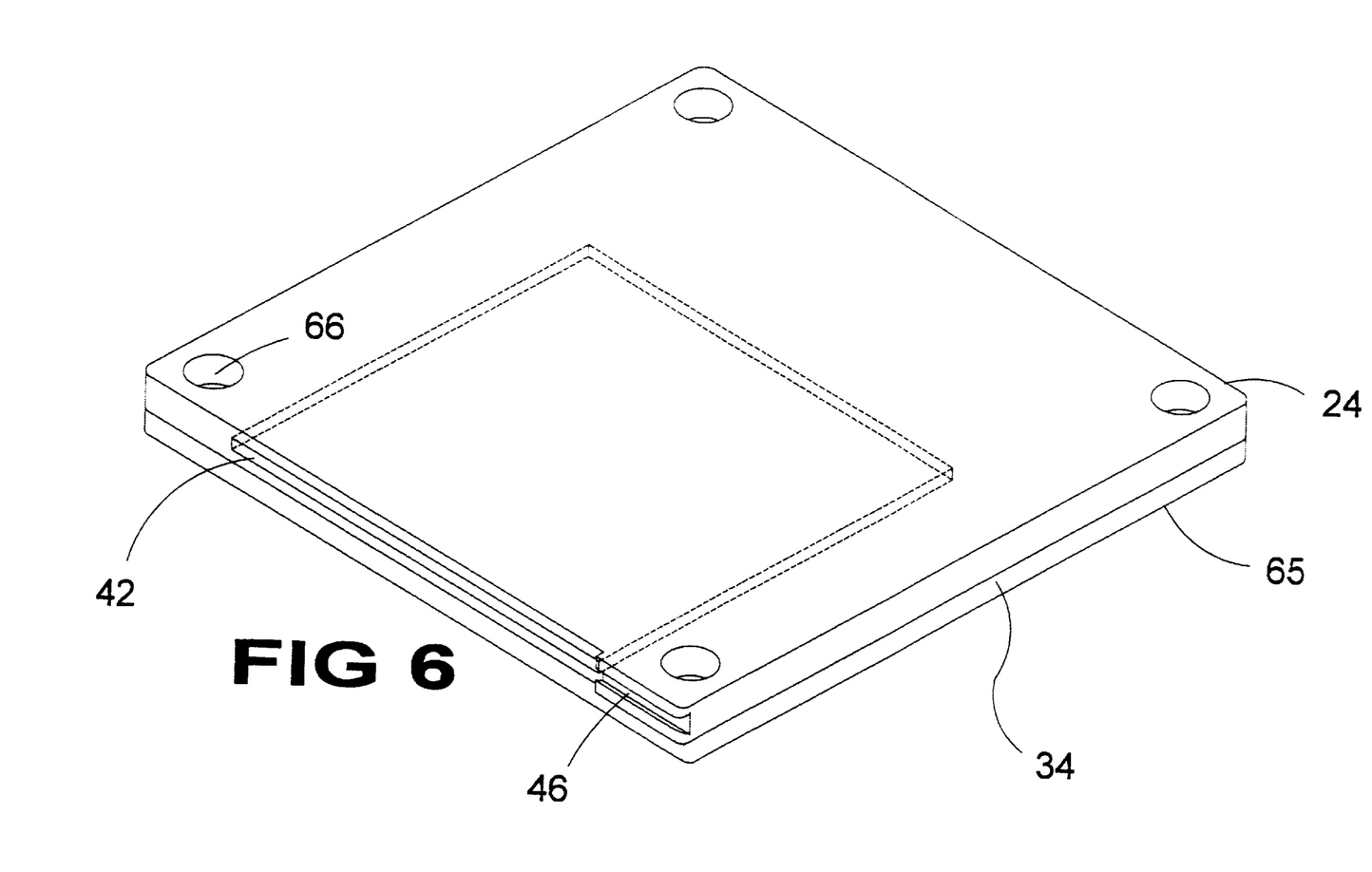
FIG. 6 is a perspective view of the base planar member of the mouse platform having a non skid bottom surface having a dove tail channel for inserting and retaining a slidable locking member. Also shown is an for inserting the padded forearm platform tongue member.

Turning to FIG. 6, therein is shown a perspective view of the base planar member 34 of the mouse platform 24 having a non-skid bottom surface 65 having a dove tail groove or channel 46 located on its edge for inserting and retaining a slidable locking member (not shown). Also shown is an aperture 42 for inserting the padded forearm platform tongue member (not shown). Aperture 66 for inserting peg 70 (not shown) is also shown.

Figure 6A:
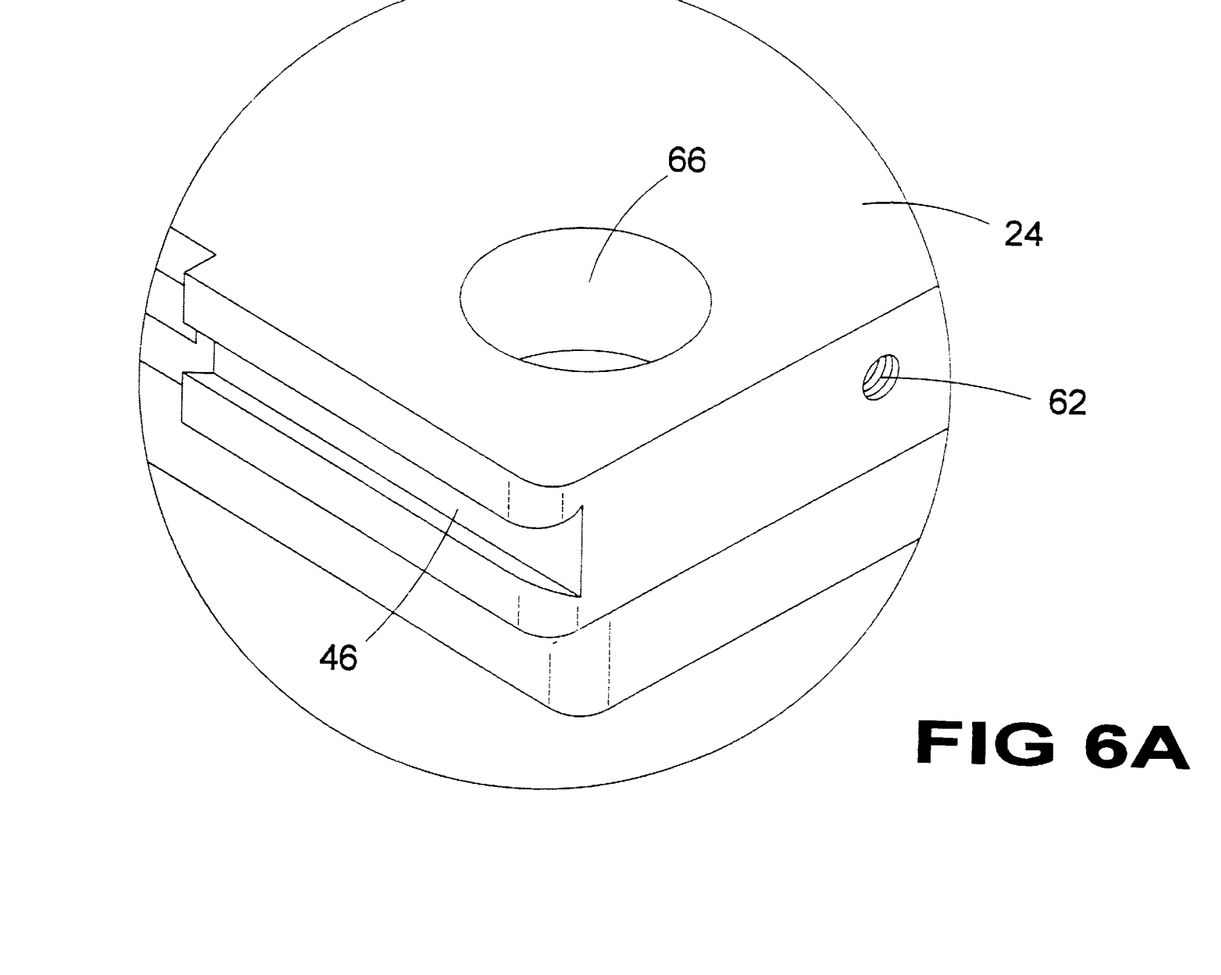
FIG. 6A is an enlarged view of the mouse platform dovetail channel used for inserting and retaining a slidable locking member. Also shown is threaded means for attaching said locking member to the mouse pad platform.

Turning to FIG. 6A, therein is shown an enlarged view of the mouse platform dovetail channel or groove 46 used for inserting and retaining a horizontally slidable locking member (not shown). Also shown is the female threaded means 62 for attaching the attachment member 50 (not shown) to the mouse pad platform 24.

Figure 7:
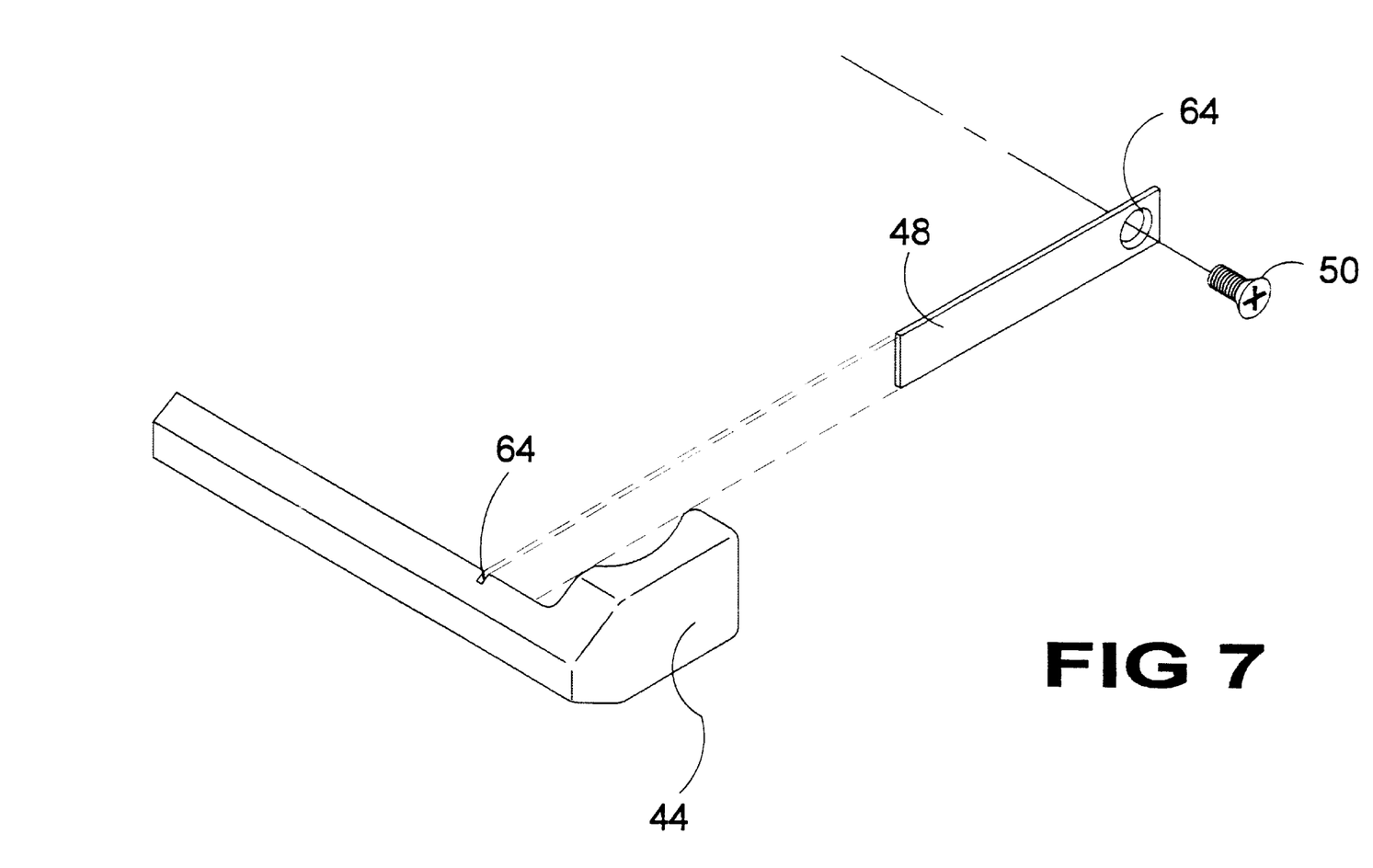
FIG. 7 is a perspective view of the slidable locking mechanism of the mouse pad platform which travels within the mouse pad platform dovetail channel having fastening means for attaching said locking member to the mouse pad platform. Said slidable locking member is used to selectively engage one of the padded forearm platform tongue slots providing adjustment means for the distance between the padded forearm platform and the mouse pad platform.

Turning to FIG. 7, therein is shown a perspective view of the slidable locking mechanism 44 of the mouse pad platform (not shown) which travels within the mouse pad platform dovetail channel 46 having fastening means 48 for attaching said locking member 44 to the mouse pad platform. The slidable locking member 44 is used to selectively engage perpendicularly to one of the padded forearm platform tongue slots (not shown) providing adjustment means for the distance between the padded forearm platform 20 and the mouse pad platform 24. Also shown is pin member 48 having an aperture 64 therein for receiving the male pin threaded means 50. Locking means 44 has a notch 64 therein for receiving the tip of pin member 48 and thereby securing locking means 44.

Figure 8:
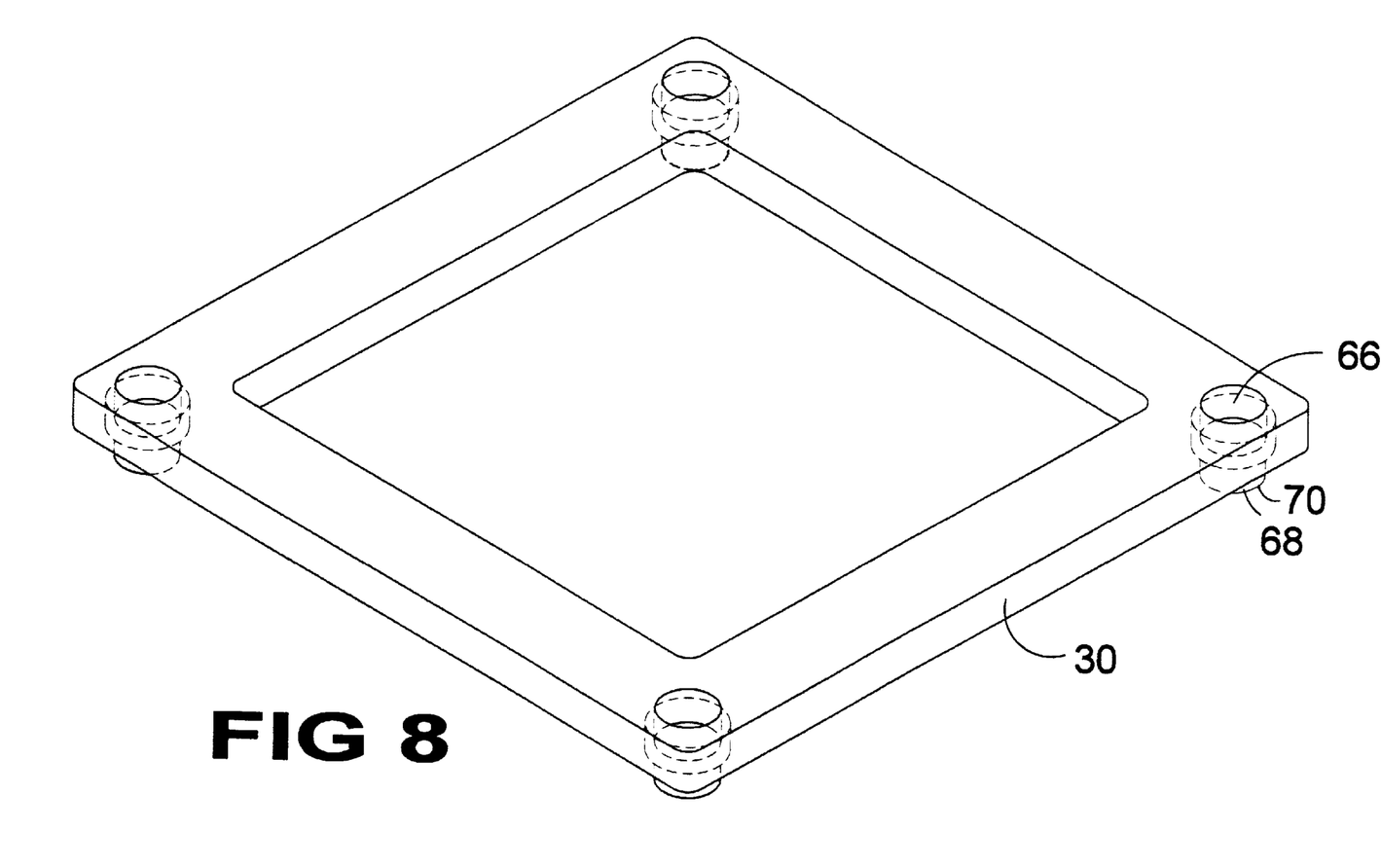
FIG. 8 is a perspective view of one of the mouse pad height adjustment members having a plurality of pegs for engaging the mouse platform base member and a number of apertures for receiving other height adjustment members.

Turning to FIG. 8, therein is shown a perspective view of one of the mouse pad height adjustment members 30 having a plurality of height adjustment members 68 having pegs 70 for engaging the mouse platform base member 52 located below and a number of apertures 6 for receiving the pegs of other height adjustment members located above.

Figure 9:
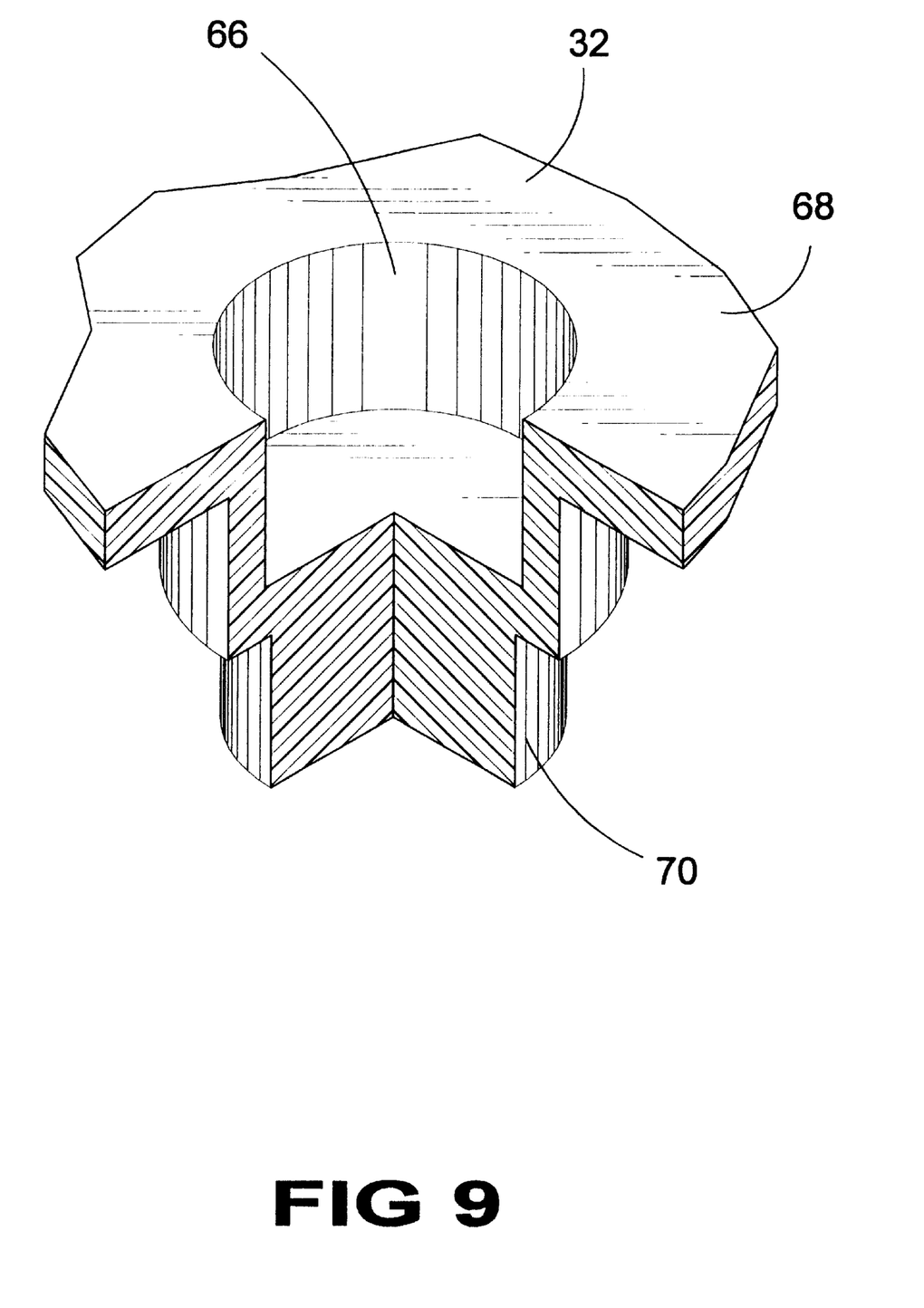
FIG. 9 is a cutaway view of one of the apertures of the height adjustment used to receive engaging height adjustment members.

Turning to FIG. 9, therein is shown a cutaway view of one of the apertures 66 of the height adjustment members 68 used to receive the pegs 70 (not shown) of other engaging height adjustment members 68.

What is claimed is:

1. An apparatus for operating a mouse computer input device on a desk or like work surface, comprising:
   a) a first means for receiving the forearm of the user;
   b) a second means for receiving said first means for receiving the forearm of the user, said second means having an upper surface positioned in the generally horizontal plane upon which said first means operates;
   c) a third means for receiving the mouse;
   d) means for connecting said second means for receiving said first means to said third means for receiving the mouse;
   e) said third means for receiving the mouse having an upper surface positioned in the generally horizontal plane upon which the mouse operates;
   f) said first means for receiving the forearm of the user being moveable;
   g) a plurality of means for moving positioned on the bottom of said first means for receiving the forearm of the user, said means for moving being moveable in a 360 degree direction, whereby said first means for receiving is moveable in a 360 degree direction, said means for moving further comprising a plurality of roller balls.

2. The apparatus of claim 1, wherein said means for moving further comprises a plurality of sleeves within which said plurality of roller balls are positioned.

3. The apparatus of claim 2, further comprising a plurality of sockets within which said plurality of sleeves are positioned, said plurality of sleeves fixedly mounted on the bottom of said first means for receiving the forearm of the user.

4. An apparatus for operating a mouse computer input device on a work surface, comprising:
   a) a first means for receiving the forearm of the user;
   b) a second means for receiving said first means for receiving the forearm of the user, said second means having an upper surface positioned in a generally horizontal plane upon which said first means operates;
   c) a third means for receiving the mouse;
   d) means for connecting said second means for receiving said first means to said third means for receiving the mouse;
   e) said third means for receiving the mouse having an upper surface positioned in the generally horizontal plane upon which the mouse operates;
   f) said first means for receiving the forearm of the user being moveable;
   g) said means for connecting further comprises a plate communicating between said second means for receiving said first means for receiving the forearm of the user and said third means for receiving the mouse, said second means further comprising a first platform upon which said first means for receive can operate; and
   h) said plate further comprises slots on one edge for receiving a locking means, said locking means attached to said third means for receiving the mouse, said third means further comprising a second platform upon which said mouse can operate.

5. The apparatus of claim 4, said locking means further comprising a horizontal groove positioned in said second platform, said groove for slidably receiving a locking member, said second platform further comprising a pin member attached thereto, said locking means having a notch therein, said pin member communicating with said notch, said pin member securing said locking means to said second platform, said locking means being perpendicular to said plate, said locking means releasably engaging said slots of said plate for adjusting the distance between said first platform and said second platform.

6. The apparatus of claim 4, said second platform having a cavity therein for receiving said plate of said first platform.

7. The apparatus of claim 4, said second platform having means for adjusting its height, said platform further comprising a base member, said base member having a non-skid bottom surface for contacting a work surface.

8. The apparatus of claim 7, said means for adjusting height further comprising multiple horizontal members, said multiple horizontal members having generally the same shape of said second platform.

9. The apparatus of claim 8, said multiple horizontal members having attachment means positioned on the corners of said horizontal members, said attachment means comprising pegs which communicate between said horizontal member and said second platform, said pegs providing means for stacking said horizontal members onto each other and onto said second platform, said horizontal members overlying each other.

10. The apparatus of claim 9, said pegs further comprising an aperture on its top for receiving said peg from said overlying horizontal member.

* * * * *